O. DALFOND.
FRICTION LET-OFF.
APPLICATION FILED DEC. 12, 1910.

1,024,064.

Patented Apr. 23, 1912.

WITNESSES:

Octavien Dalfond INVENTOR

UNITED STATES PATENT OFFICE.

OCTAVIEN DALFOND, OF FALL RIVER, MASSACHUSETTS, ASSIGNOR TO THE STANDARD EQUIPMENT COMPANY, A CORPORATION OF MASSACHUSETTS.

FRICTION LET-OFF.

1,024,064.  Specification of Letters Patent.  Patented Apr. 23, 1912.

Application filed December 12, 1910. Serial No. 596,934.

*To all whom it may concern:*

Be it known that I, OCTAVIEN DALFOND, a citizen of the United States, residing at Fall River, in the county of Bristol and State of Massachusetts, have invented certain new and useful Improvements in Friction Let-Offs, of which the following is a specification.

The present invention relates to friction let off and particularly to a new compound gear lever construction and arrangement therefor.

It is particularly applicable to looms for weaving cotton, wool &c. and has for its object to increase the steadiness of action of the machine, which object, among others, is accomplished by the construction and combination of parts hereinafter more particularly set forth and claimed.

Figure 1:
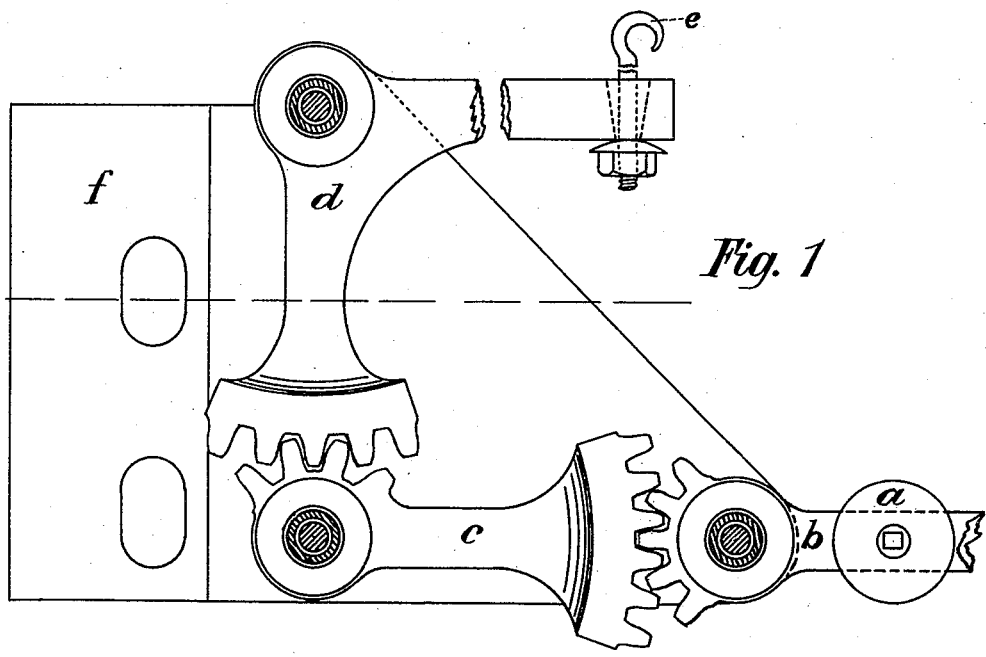
Figure 2:
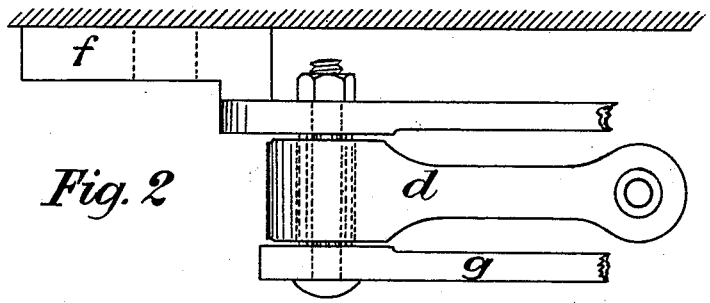
Figure 3:
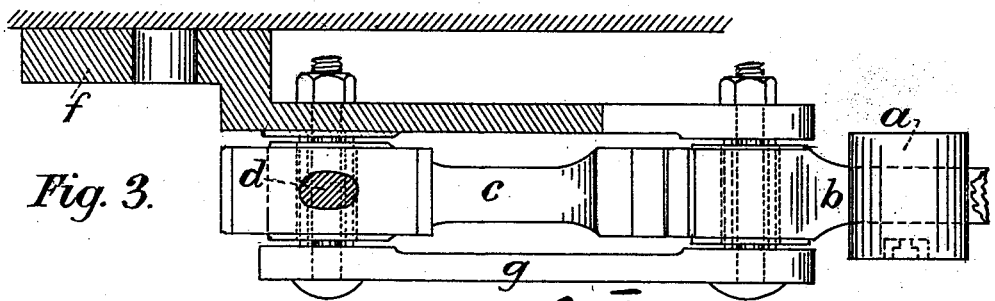

In the accompanying drawings: Figure 1 represents a view in side elevation of a device embodying my invention; Fig. 2, a top plan view of the same, partly broken away, and Fig. 3, a view on the line 3—3 of Fig. 1, looking in the direction of the arrow.

Referring now in detail to the drawings, $f$ designates an angular bracket of plate metal adapted to be mounted on the frame of the loom and provided with three perforations or bolt holes arranged in the form of a triangle. Three levers $b$, $c$, $d$ respectively are held in position by three bolts $h$ which pass respectively through holes or perforations in the ends of links $g$, two in number, through the hubs of said levers and through the three bolt holes in the bracket above referred to, when a nut $n$ is turned on each bolt, thus providing a firm and braced construction, holding all the levers in correct engagement. It will be seen that the bolts $h$ act as fulcrums or pivots for the levers $b$, $c$, $d$.

The lever $b$ is pivotally mounted on the lower right hand bolt and is provided with an adjustable weight $a$ slidable along the same and provided with a friction screw $a'$ for engaging said lever and locking said weight at any desired point thereof. Said lever $b$ is further provided, on its other end, with a quadrant or set of gear teeth $b'$ which mesh with the quadrant or gear teeth $c'$ of the lever $c$ fulcrumed on the lower left hand bolt $h$ and provided on the upper side of its hub with a quadrant or set of gear teeth $c^2$. On the upper bolt $h$ is fulcrumed the lever $d$, of bell crank type, provided with a vertical arm and a horizontal arm.

The horizontal arm is provided with an upwardly flaring hole $k$, through which is passed the stem of hook $e$ which engages the chain or rope (not shown) passing over and around the friction pulley. A convex washer $l$ is passed over the lower end of said stem, with its convex face upward, and a nut $m$ is turned on the end of said stem thus allowing the hook $e$ to pivotally adjust its angle and direction of inclination with relation to the position of said horizontal arm and the tension exerted thereon. The lower end of the vertical arm of said lever $d$ is provided with a quadrant or set of gear teeth $d'$ which mesh with the gear teeth $c^2$ of the lever $c$.

Friction sleeves, slightly longer than the thickness of said levers $b$, $c$, $d$ are passed through the hubs thereof, the bolts $h$ above mentioned passing through said sleeves and tightly clamp the same in position, thus providing a guard against binding the levers and giving free action thereof and a great degree of delicacy in the operation of the adjusting weight $a$.

The device is simple and the operation is obvious from the above and from a scrutiny of the drawings. It is as follows: To increase the tension: The weight $a$ is slid along the lever $b$ away from the hub thereof. This depresses the lever causing it to swing downward on its fulcrum and causing the gear teeth $b'$ thereof to turn to the right. These teeth $b'$ meshing with teeth $c'$ of lever $c^2$ cause said lever to rise, turning its teeth $c^2$ to the left. Teeth $c^2$ meshing with teeth $d'$ of lever $d$ cause said teeth $d'$ to turn to the left, thus causing the vertical arm of said lever to swing on its fulcrum to the left and consequently the horizontal arm to swing downward, thus increasing the pull of hook $e$ on the chain or rope before mentioned. To decrease the tension the weight $a$ is slid along the lever $b$ toward the hub thereof. In this latter case the operation is just the reverse from that above described.

Having thus described my invention, what I claim as new and desire to secure by Letters Patent is:

1. In combination, a bracket adapted to be mounted on a loom frame, three levers pivotally mounted on said bracket, said levers being provided with intermeshing gear teeth and one of said levers being provided with a normally vertical and a normally horizontal arm, said horizontal arm being provided with an upwardly flaring hole near its end, a hook secured in said hole and an adjustable weight slidably mounted on one of said levers for adjusting the position of said hook.

2. In combination, a bracket adapted to be mounted on a machine frame, a bell crank lever mounted on said frame, one arm of said lever being provided with a set of gear teeth and the other having a flaring hole, a hook having a stem passing through said hole, a convex washer passed over said stem with its convex face toward said hole, a nut turned on said stem, a lever mounted on said bracket and having gear teeth meshing with the above gear teeth on one end and gear teeth on its other end, a lever mounted on said bracket and having gear teeth meshing with the last mentioned gear teeth and an adjustable weight slidably mounted thereon.

3. In combination, a bracket, a set of levers pivotally mounted on said bracket, a set of links connected by bolts for firmly holding said levers in proper position, a hook pivotally mounted in one of said levers, intermeshing gear teeth on said levers and a weight for adjusting the position of said hook.

4. In combination, a bracket provided with perforations and adapted to be mounted on a machine frame, a series of links provided with perforations, a series of levers having hubs, a bearing sleeve passing through the bore in each hub, means passing through said links, sleeves and bracket for holding said parts firmly together in their proper positions, a hook mounted in one of said levers, an adjustable weight slidably mounted on another of said levers and means for locking said weight in any position of adjustment desired, said levers being provided with intermeshing gear teeth, substantially as, and for the purpose, set forth.

In testimony whereof, I affix my signature in presence of two witnesses.

OCTAVIEN DALFOND.

Witnesses:
C. L. ONDET,
ALVIN G. WEEKS.

---

Copies of this patent may be obtained for five cents each, by addressing the "Commissioner of Patents, Washington, D. C."